(12) United States Patent
Tsumano

(10) Patent No.: US 9,075,703 B2
(45) Date of Patent: Jul. 7, 2015

(54) VEHICLE STATE AMOUNT ESTIMATING DEVICE

(75) Inventor: Mitsuhiro Tsumano, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/991,313

(22) PCT Filed: Feb. 10, 2012

(86) PCT No.: PCT/JP2012/053186
§ 371 (c)(1),
(2), (4) Date: Aug. 19, 2013

(87) PCT Pub. No.: WO2012/111576
PCT Pub. Date: Aug. 23, 2012

(65) Prior Publication Data
US 2013/0338869 A1    Dec. 19, 2013

(30) Foreign Application Priority Data

Feb. 17, 2011 (JP) ................................. 2011-032125

(51) Int. Cl.
| | |
|---|---|
| *G06F 17/00* | (2006.01) |
| *B60T 8/172* | (2006.01) |
| *B60T 8/1755* | (2006.01) |
| *B60W 30/02* | (2012.01) |
| *B60G 17/0195* | (2006.01) |
| *G07C 5/00* | (2006.01) |
| *B60W 10/184* | (2012.01) |
| *B60W 10/20* | (2006.01) |

(52) U.S. Cl.
CPC ................ *G06F 17/00* (2013.01); *G07C 5/008* (2013.01); *B60T 8/172* (2013.01); *B60T 8/17551* (2013.01); *B60W 10/184* (2013.01); *B60W 10/20* (2013.01); *B60W 30/025* (2013.01); *B60W 2520/125* (2013.01); *B60W 2520/20* (2013.01); *B60W 2520/26* (2013.01); *B60W 2720/125* (2013.01); *B60W 2720/20* (2013.01); *B60G 17/0195* (2013.01)

(58) Field of Classification Search
CPC combination set(s) only.
See application file for complete search history.

(56) References Cited

U.S. PATENT DOCUMENTS

| | | | |
|---|---|---|---|
| 6,691,017 B2 * | 2/2004 | Banno et al. ..................... 701/84 |
| 7,412,318 B2 * | 8/2008 | Fujioka et al. ................... 701/70 |
| 2005/0192728 A1 | 9/2005 | Yasui et al. | |
| 2008/0255726 A1 | 10/2008 | Fischlein et al. | |

FOREIGN PATENT DOCUMENTS

JP          5-016633 A    1/1993
(Continued)

*Primary Examiner* — Thomas G Black
*Assistant Examiner* — Ana Thomas
(74) *Attorney, Agent, or Firm* — Sughrue Mion, PLLC

(57) ABSTRACT

To provide a vehicle state amount estimating device capable of suppressing sudden change in behavior at the time of behavior control of the vehicle, in a vehicle state amount estimating device that estimates a target lateral acceleration used in a behavior control of a vehicle based on a lateral acceleration actual measurement value and a lateral acceleration estimated value at time of traveling of the vehicle; when estimating the target lateral acceleration based on the lateral acceleration actual measurement value and the lateral acceleration estimated value, the target lateral acceleration is estimated by performing weighting on the lateral acceleration actual measurement value and the lateral acceleration estimated value according to a state of side slipping of the vehicle.

5 Claims, 6 Drawing Sheets

(56) References Cited

FOREIGN PATENT DOCUMENTS

| JP | 2005-238972 A | 9/2005 |
| JP | 2006-168387 A | 6/2006 |
| JP | 2008-260524 A | 10/2008 |
| JP | 2010-202013 A | 9/2010 |

* cited by examiner

VEHICLE STATE AMOUNT ESTIMATING DEVICE

CROSS REFERENCE TO RELATED APPLICATIONS

This application is a National Stage of International Application No. PCT/JP2012/053186 filed Feb. 10, 2012, claiming priority based on Japanese Patent Application No. 2011-032125, filed Feb. 17, 2011, the contents of all of which are incorporated herein by reference in their entirety.

FIELD

The present invention relates to a vehicle state amount estimating device.

BACKGROUND

During traveling of a vehicle, a desired motion control is carried out by controlling each device capable of controlling a traveling state of a vehicle while detecting and estimating a state amount of a vehicle in a vehicle where a quantity of motion of the vehicle is controlled according to the traveling state. For example, in a vehicle active suspension described in Patent Literature 1, the position control of the vehicle is carried out based on a control amount, which corresponds to an actual lateral acceleration detected from a lateral G sensor, and a control amount, which corresponds to a calculated lateral acceleration predicted based on outputs of a steering angle sensor and a vehicle speed sensor.

The vehicle active suspension stops the use of the calculated lateral acceleration when detecting that the vehicle is in a side slipping state to suppress a state in which the position control is carried out using the calculated lateral acceleration, which is beyond the actual vehicle body behavior, at the time of occurrence of side slipping from being obtained. Furthermore, if determined that a difference between the calculated lateral acceleration and the actual lateral acceleration is not greater than or equal to a predetermined value, the determination on the difference between the calculated lateral acceleration and the actual lateral acceleration is again repeated after elapse of a predetermined time. The undesired roll thus can be suppressed from occurring.

CITATION LIST

Patent Literature

Patent Literature 1: Japanese Patent Application Laid-open No. H05-16633

SUMMARY

Technical Problem

However, when switching a value of the lateral acceleration to use for the control according to the traveling state of the vehicle during the motion control of the vehicle that uses an estimated value of the lateral acceleration and a detected value of the lateral acceleration, a target lateral acceleration at the time of control suddenly changes. This leads to sudden change in the behavior of the vehicle, and hence improvements still can be made on the estimation of the state amount of the vehicle at the time of behavior control of the vehicle.

In light of the foregoing, it is an object of the present invention to provide a vehicle state amount estimating device capable of suppressing the sudden change in the behavior at the time of the behavior control of the vehicle.

Solution to Problem

In order to solve the above mentioned problem and achieve the object, a vehicle state amount estimating device, according to the present invention, that estimates a state amount used in a behavior control of a vehicle based on an actual state amount and an estimated state amount at time of traveling of the vehicle, wherein when estimating the state amount based on the actual state amount and the estimated state amount, the state amount is estimated by performing weighting on the actual state amount and the estimated state amount according to a state of side slipping of the vehicle, a state in which the weighting of the actual state amount is large is maintained regardless of the state of the side slipping when the side slipping becomes larger than or equal to a predetermined value, and the state in which the weighting of the actual state amount is large is released when a state in which a difference between the actual state amount and the estimated state amount is smaller than or equal to a predetermined value is continued for a predetermined time.

Further, in the vehicle state amount estimating device, it is preferable that the state in which the weighting of the actual state amount is large is released when a state in which the difference between the actual state amount and the estimated state amount is smaller than or equal to the predetermined value and the side slipping is smaller than or equal to the predetermined value is continued for the predetermined time.

Further, in the vehicle state amount estimating device, it is preferable that the state in which the weighting of the actual state amount is large is maintained by limiting the weighting of the estimated state amount when the side slipping becomes larger than or equal to the predetermined value.

Further, in the vehicle state amount estimating device, it is preferable that when maintaining the state in which the weighting of the actual state amount is large, an increase in the weighting of the actual state amount according to the state of the side slipping is tolerated.

Advantageous Effects of Invention

A vehicle state amount estimating device according to the present invention has an effect of suppressing sudden change in behavior at the time of behavior control of the vehicle by estimating a state amount to use in a behavior control of a vehicle based on an actual state amount and an estimated state amount, estimating the state amount while maintaining a state in which the weighting of the actual state amount is large regardless of a state of side slipping when the side slipping of the vehicle becomes larger than or equal to a predetermined value, and releasing the state in which the weighting of the actual state amount is large when a state in which a difference between the actual state amount and the estimated state amount is smaller than or equal to a predetermined value is continued for a predetermined time.

DESCRIPTION OF EMBODIMENTS

An embodiment of a vehicle state amount estimating device according to the present invention will be hereinafter described in detail based on the drawings. The present invention is not limited by such embodiment. The configuring elements in the embodiment described below include elements that can be easily replaced by those skilled in the art and that are substantially the same.

[Embodiment]

Figure 1:
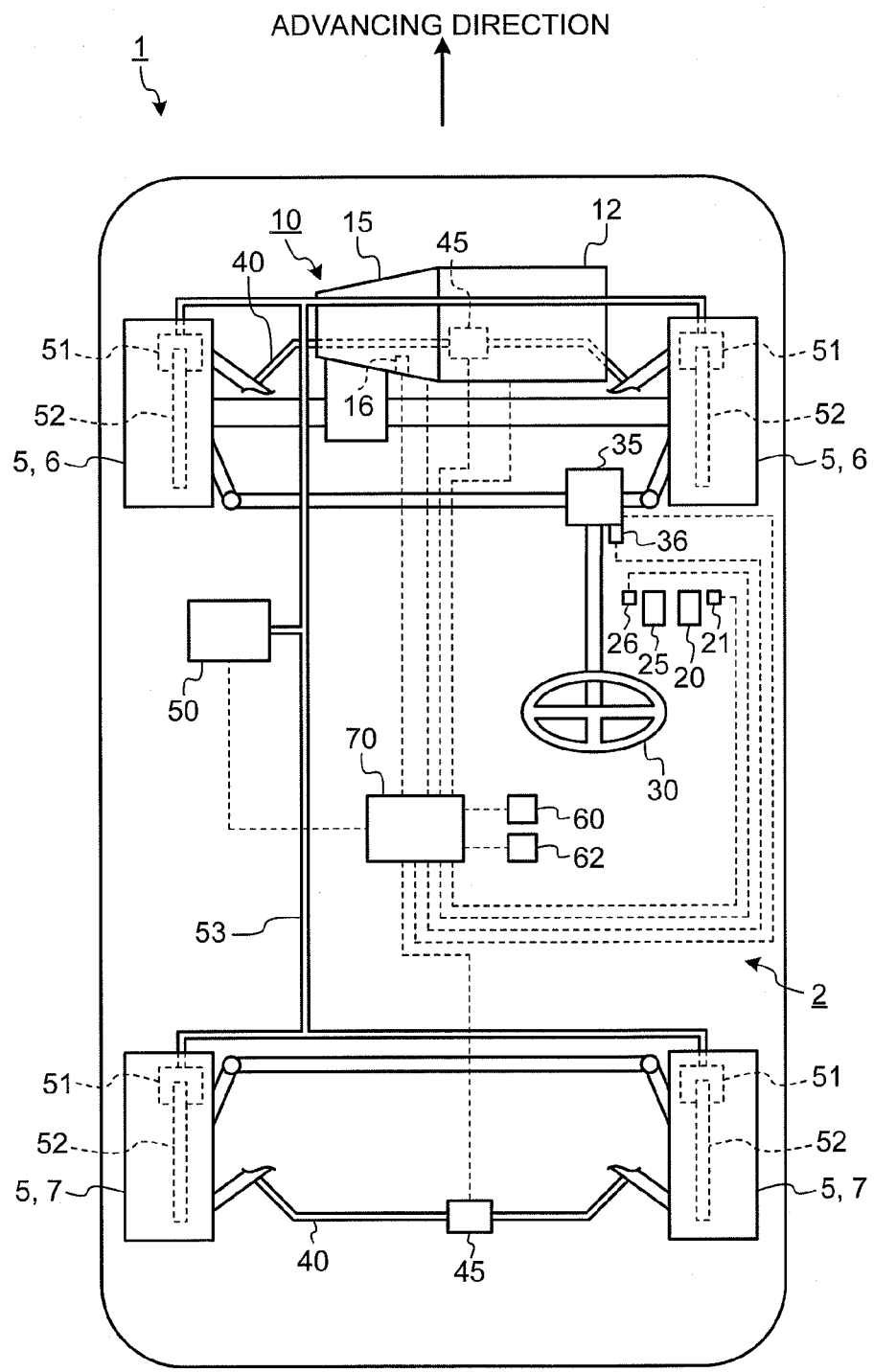
FIG. 1 is a schematic diagram of a vehicle including a vehicle state amount estimating device according to an embodiment.

FIG. 1 is a schematic view of a vehicle including a vehicle state amount estimating device according to the embodiment. A vehicle 1 including a vehicle state amount estimating device 2 according to the embodiment has an engine 12, which is an internal combustion engine, mounted as a power source, and can travel with the power of the engine 12. An automatic transmission 15, which is an example of a speed change gear, is connected to the engine 12, so that the power generated by the engine 12 can be transmitted to the automatic transmission 15. The automatic transmission 15 has a plurality of gear stages, in which the change gear ratio differs, where the vehicle 1 can travel when the power gear changed by the automatic transmission 15 is transmitted as a driving force to left and right front wheels 6 arranged as drive wheels among wheels 5 of the vehicle 1 through a power transmission path. Therefore, a device capable of transmitting the driving force to the front wheel 6, which is the drive wheel, such as the engine 12, the automatic transmission 15 is arranged as a drive device 10. The automatic transmission 15 configuring the drive device 10 includes a vehicle speed sensor 16, which is a vehicle speed detecting means, capable of detecting a vehicle speed by detecting the rotation speed of an output shaft (not illustrated) of the automatic transmission 15.

The vehicle 1 includes an accelerator pedal 20 and a brake pedal 25, which are used by the driver to perform the driving operation, and further includes an accelerator position sensor 21 and a brake sensor 26 for detecting the operation amount of the pedals, respectively.

The vehicle 1 including the vehicle state amount estimating device 2 according to the present embodiment is a so-called front wheel drive vehicle in which the power generated by the engine 12 is transmitted to the front wheel 6 and the driving force is generated by the front wheel 6, but the vehicle 1 may adopt driving types other than the front wheel drive such as a rear wheel drive in which the driving force is generated by a rear wheel 7, a four wheel drive in which the driving force is generated in all the wheels 5. The engine 12 may be a reciprocal spark ignited internal combustion engine, or may be a reciprocal compression ignited internal combustion engine. The drive device 10 may use a unit other than the internal combustion engine for the power source, or may be an electrical drive device 10 that uses an electrical motor as a power source, or a hybrid drive device 10 that uses both the engine 12 and the electrical motor.

The front wheel 6 is arranged as a drive wheel, and at the same time, is arranged as a steering wheel, and thus the front wheel 6 is arranged to be steerable with a steering wheel 30 used when the driver performs the driving operation. The steering wheel 30 is connected to an Electric Power Steering (EPS) device 35, which is an electrical power steering device, and is arranged to be able to steer the front wheel 6 through the EPS device 35. The EPS device 35 arranged in such manner includes a steering angle sensor 36, which is a steering angle detecting means, for detecting a steering angle, which is a rotation angle of the steering wheel 30.

A wheel cylinder 51 that operates by hydraulic pressure, and a brake disc 52 that is arranged as a set with the wheel cylinder 51 and that integrally rotates with the wheel 5 at the time of the rotation of the wheel 5, are arranged in the vicinity of each wheel 5. The vehicle 1 includes a brake hydraulic pressure control device 50, which is connected with the wheel cylinder 51 by a hydraulic pressure path 53 and which controls the hydraulic pressure to act on the wheel cylinder 51 at the time of brake operation. The brake hydraulic pressure control device 50 is arranged to be able to control the hydraulic pressure independently with respect to each wheel cylinder 51 arranged in the vicinity of each wheel 5. Thus, the brake hydraulic pressure control device 50 is arranged to be able to independently control the braking force of a plurality of wheels 5.

Each wheel 5 is supported by a suspension unit, and the left and right suspension units in a width direction of the vehicle 1 are connected with a stabilizer 40. In other words, the stabilizer 40 has both ends connected to the left and right suspension units, respectively, and the left and right suspension units are connected by way of the stabilizer 40. The stabilizer 40 arranged in such manner can transmit the vertical motion of one wheel 5 to the other wheel 5 between the left and right wheels 5 supported by the suspension units. Furthermore, the stabilizer 40 includes a stabilizer actuator 45 capable of adjusting the transmission rate when transmitting the vertical motion of one wheel 5 to the other wheel 5.

The vehicle 1 also includes at least a G sensor 62 capable of detecting the acceleration in the width direction of the vehicle 1, and a yaw rate sensor 60, which is a yaw rate detecting means, capable of detecting the yaw rate at the time of traveling of the vehicle 1. The vehicle speed sensor 16, the accelerator position sensor 21, the brake sensor 26, the steering angle sensor 36, the yaw rate sensor 60, the G sensor 62, the EPS device 35, the stabilizer actuator 45, the brake hydraulic pressure control device 50, the engine 12, and the automatic transmission 15 are connected to an Electrical Control Unit (ECU) 70 for controlling each unit of the vehicle 1 and are arranged to be controllable by the ECU 70.

Figure 2:
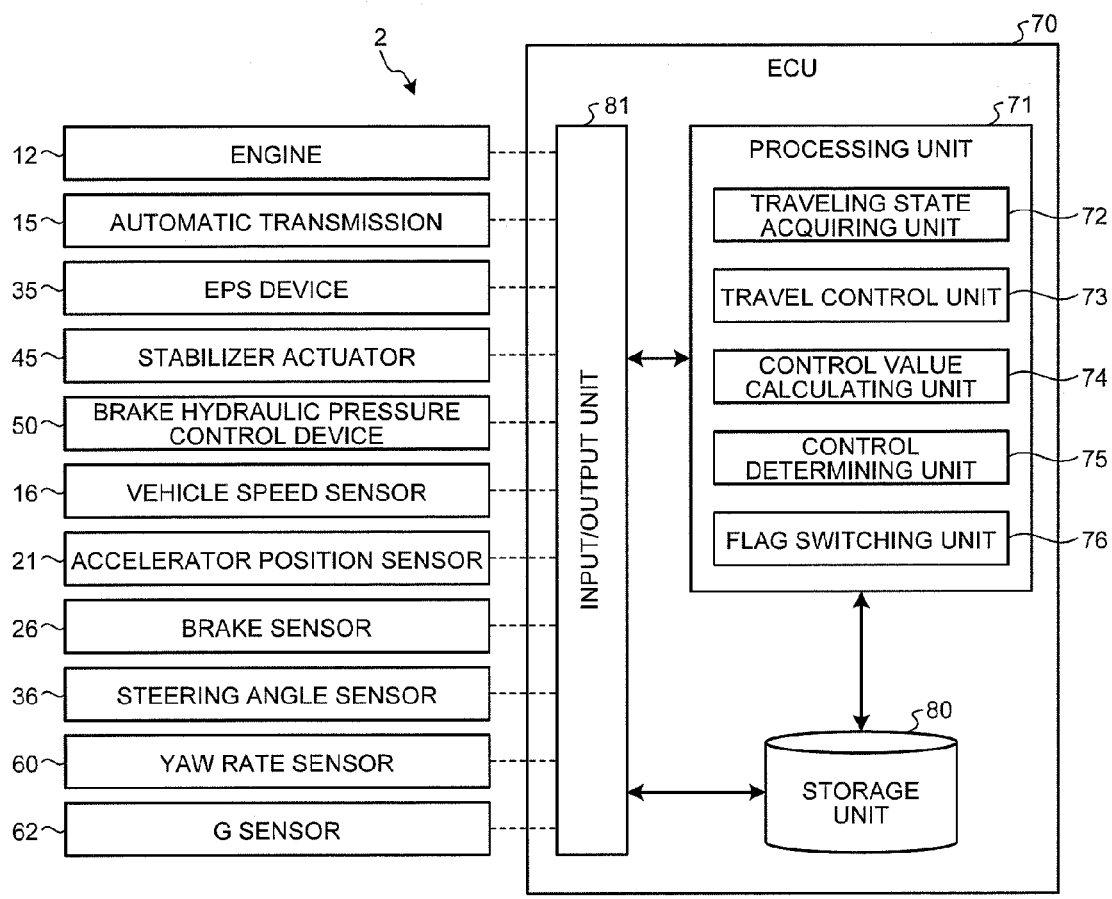
FIG. 2 is a configuration diagram of the main parts of the vehicle state amount estimating device illustrated in FIG. 1.

FIG. 2 is a configuration diagram of the main parts of the vehicle state amount estimating device illustrated in FIG. 1. The ECU 70 includes a processing unit 71 including a Central Processing Unit (CPU), and the like, a storage unit 80 such as a Random Access Memory (RAM), and an input/output unit 81, which are all connected to each other so that signals can be exchanged with each other. The sensors such as the vehicle speed sensor 16, the accelerator position sensor 21, the brake sensor 26, the steering angle sensor 36, the yaw rate sensor 60, and the G sensor 62, as well as devices such as the EPS device 35, the stabilizer actuator 45, the brake hydraulic pressure control device 50, the engine 12, and the automatic transmission 15 connected to the ECU 70 are connected to the input/output unit 81, so that the input/output unit 81 inputs/outputs signals with the sensors and the devices. The storage unit 80 stores a computer program for controlling the vehicle 1.

The processing unit 71 of the ECU 70 arranged in such manner includes a traveling state acquiring unit 72 for acquiring a traveling state of the vehicle 1 and a state of the driving operation of the driver, a travel control unit 73 for performing the travel control of the vehicle 1, a control value calculating unit 74 for performing a calculation of various types of control values to be used in the travel control of the vehicle 1, a control determining unit 75 for performing each determination at the time of travel control of the vehicle 1, and a flag switching unit 76 for switching a flag used at the time of the travel control of the vehicle 1.

When performing the control of the vehicle 1 by the ECU 70, for example, the processing unit 71 reads the computer program into a memory incorporated in the processing unit 71 and performs the calculation based on the detection results of the accelerator position sensor 21, and the like, and the engine 12, the automatic transmission 15, and the like are controlled in accordance with the result of the calculation to perform the driving control of the vehicle 1. In this case, the processing unit 71 appropriately stores the numerical value in the middle of the calculation in the storage unit 80, and retrieves the stored numerical value to execute the calculation.

The vehicle state amount estimating device 2 according to the present embodiment is configured as described above, and the effects thereof will be hereinafter described. At the time of traveling of the vehicle 1 including the vehicle state amount estimating device 2, the driving operation state by the driver such as the operation amount of the accelerator pedal 20, and the like is detected with a detecting means such as the accelerator position sensor 21, and the traveling state acquiring unit 72 of the processing unit 71 of the ECU 70 acquires the detection result. The state of the driving operation, and the like acquired by the traveling state acquiring unit 72 are transmitted to the travel control unit 73 of the processing unit 71 of the ECU 70.

The travel control unit 73 performs the travel control of the vehicle 1 based on the state of the driving operation, and the like acquired by the traveling state acquiring unit 72. When performing the travel control of the vehicle 1, the fuel injection control, the ignition control, and the like of the engine 12 are carried out in accordance with the traveling state, and the like transmitted from the traveling state acquiring unit 72, so that the desired power can be generated in the engine 12, and the gear shift stage of the automatic transmission 15 can be changed to the gear shift stage that can generate the desired driving force. The driving force is generated at the front wheel 6 by controlling the devices in the above manner and transmitting the power generated in the engine 12 to the front wheel 6 arranged as the drive wheel through the power transmission path such as the automatic transmission 15.

At the time of traveling of the vehicle 1, not only is the driving force generated but the braking force is also generated to adjust the vehicle speed, where the driver operates the brake pedal 25 when generating the braking force in the vehicle 1. The operation force when the brake pedal 25 is operated is applied to the wheel cylinder 51 as a hydraulic pressure through the brake hydraulic pressure control device 50 and the hydraulic pressure path 53. The wheel cylinder 51 is activated by the hydraulic pressure, and reduces the rotation speed of the brake disc 52, which rotates integrally with the wheel 5, by frictional force. The rotation speed of the wheel 5 also lowers, and hence the wheel 5 generates the braking force with respect to the road surface thus decelerating the vehicle 1.

The brake hydraulic pressure control device 50 can be activated based on the operation on the brake pedal 25 or regardless of the operation state of the brake pedal 25 to generate the hydraulic pressure. The brake hydraulic pressure control device 50 can be controlled by the travel control unit 73 of the ECU 70, so that the travel control unit 73 controls the brake hydraulic pressure control device 50 to generate the braking force regardless of the operation state of the brake pedal 25.

When changing the advancing direction of the vehicle 1 such as by turning around the vehicle 1, the steering wheel 30 is rotated to perform the steering wheel operation. When the steering wheel 30 is rotated, the rotation torque is transmitted to the EPS device 35. The EPS device 35 is activated according to the rotation torque transmitted from the steering wheel 30, and outputs the pushing force or the pulling force to a tie rod arranged between the EPS device 35 and the front wheel 6. The front wheel 6 thereby rotates, so that the rotation direction of the wheel 6 becomes a direction different from the front-back direction of the vehicle 1, and the advancing direction changes thus enabling the vehicle 1 to rotate around, and the like.

Therefore, the vehicle 1 can be turned around by operating the steering wheel 30, and the steering angle that changes when the steering wheel 30 is operated is detected with the steering angle sensor 36 arranged in the EPS device 35. The steering angle detected by the steering angle sensor 36 is transmitted to the traveling state acquiring unit 72 of the processing unit 71 of the ECU 70 and acquired by the traveling state acquiring unit 72.

When the vehicle 1 turns around, a yaw moment, which is the rotation force about the vertical axis of the vehicle 1, generates in the vehicle 1. Thus, when the yaw moment is generated in the vehicle 1, the yaw rate sensor 60 detects the yaw rate, which is the yaw angular velocity, of when the yaw moment is generated and the vehicle 1 is rotated about the vertical axis. The yaw rate detected by the yaw rate sensor 60 is transmitted to the traveling state acquiring unit 72 of the processing unit 71 of the ECU 70 and acquired by the traveling state acquiring unit 72.

When the vehicle 1 turns around, a centrifugal force is generated in the vehicle 1, and thus the acceleration in the width direction of the vehicle 1, that is, the lateral acceleration or the acceleration in the lateral direction is generated by the centrifugal force. The lateral acceleration generated during the turning around the vehicle 1 is detected by the G sensor 62, and the detection result is acquired by the traveling state acquiring unit 72 of the processing unit 71 of the ECU 70.

Although the yaw rate and the lateral acceleration during traveling are acquired from the detection results of the yaw rate sensor 60 and the G sensor 62 at the time of traveling of the vehicle 1, the vehicle state amount estimating device 2 according to the present embodiment further estimates the yaw rate and the lateral acceleration based on the driving operation of the driver, apart from the actual measurement values.

When estimating the yaw rate and the lateral acceleration, the detection result of the steering angle sensor 36 for detecting the steering angle when the driver operates the steering wheel 30 and the detection result of the vehicle speed sensor 16 for detecting the vehicle speed at the time of traveling of the vehicle 1 are acquired by the traveling state acquiring unit 72, and estimation is made with the control value calculating unit 74 of the processing unit 71 of the ECU 70 based on the acquired steering angle and the vehicle speed. When estimating the yaw rate and the lateral acceleration with the control value calculating unit 74, estimation is made by using a mathematical expression normally used when calculating the state amount using the steering angle and the vehicle speed acquired by the traveling state acquiring unit 72, and furthermore, a constant indicating the property of the vehicle 1.

During the turning around the vehicle 1, the behavior control of the vehicle 1 is carried out based on the actual measurement values and the estimated values of the yaw rate and the lateral acceleration, that is, the actual state amount, which is the actual measurement value of the state amount of the vehicle 1, and the estimated state amount, which is the estimated value of the state amount. That is, if the actual state amount and the estimated state amount indicate that the traveling state of the vehicle 1 is an unstable traveling state such as side slipping, a control to reduce the unstableness is carried out. For example, the stabilizer actuator 45 is controlled with the travel control unit 73 to control the roll amount of the vehicle 1, and the brake hydraulic pressure control device 50 is controlled to generate the braking force at the predetermined wheel 5 to perform a control to suppress the side slipping.

When performing the behavior control of the vehicle 1, the control is performed based on the actual state amount and the estimated state amount of the vehicle 1, where a magnitude of a difference in the values of the actual state amount and the estimated state amount changes by the traveling state of the vehicle 1. Specifically, the actual state amount and the estimated state amount tend to easily diverge as the traveling state of the vehicle 1 becomes an unstable state. For example, the actual measurement value and the estimated value of the yaw rate, which is an example of the actual state amount and the estimated state amount, tend to easily diverge as a drift value, which indicates the magnitude of the side slipping of the vehicle 1, becomes larger when the vehicle 1 is turning around.

Figure 3:
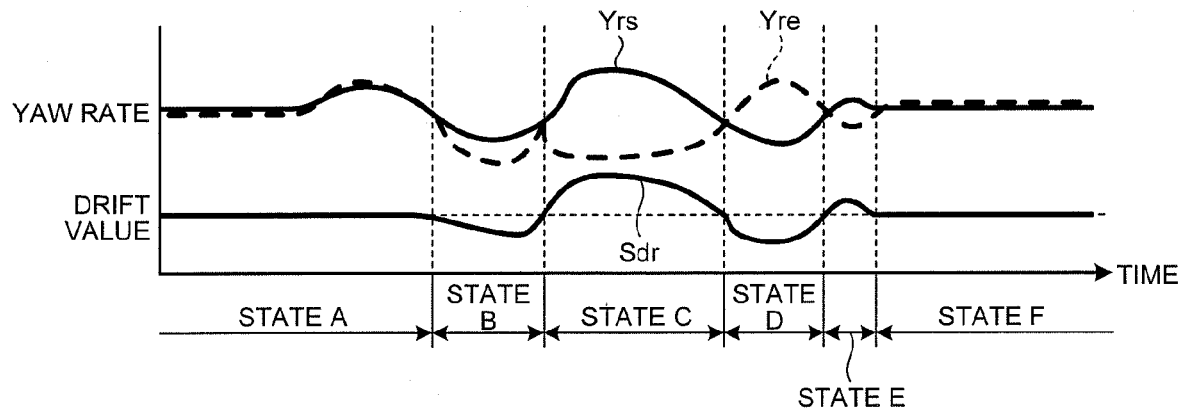
FIG. 3 is an explanatory view illustrating a relationship between a yaw rate and a drift value.

FIG. 3 is an explanatory view illustrating a relationship between the yaw rate and the drift value. The yaw rate and the drift value illustrated in FIG. 3 both indicate the magnitude of the respective values when the up and down direction in the figure is the left and right direction of the vehicle 1. Although the yaw rate and the lateral acceleration generate when the vehicle 1 is turned around, side slipping does not occur in the vehicle 1 in either left or right direction if the traveling state of the vehicle 1 is stable such as if the lateral acceleration is relatively small, and thus the drift value Sdr is in a neutral state (FIG. 3, state A). When the traveling state of the vehicle 1 is stable, a yaw rate actual measurement value Yrs, which is the detection value of the yaw rate by the yaw rate sensor 60 and an example of the actual state amount, and a yaw rate estimated value Yre, which is an estimated value of the yaw rate estimated based on the steering angle and the vehicle speed and an example of the estimated state amount, have substantially the same magnitude (FIG. 3, state A).

Therefore, when the side slipping starts to occur in the vehicle 1 while turning around, the absolute value of the drift value Sdr starts to become larger (FIG. 3, state B). In this case, the behavior of the vehicle 1 starts to indicate a behavior different from the driving operation of the driver. Thus, the yaw rate actual measurement value Yrs indicating the actual state amount of the vehicle 1 and the yaw rate estimated value Yre, which is the state amount estimated based on the driving operation of the driver, start to diverge (FIG. 3, state B).

When the behavior of the vehicle 1 becomes large and the side slipping becomes large, the driver sometimes perform an operation of so-called counter steering of steering the steering wheel 30 in the direction opposite to the rotating direction to stop the side slipping. In this case, the direction of steering by the driver is the direction opposite to the direction of the actual behavior of the vehicle 1, and thus the yaw rate estimated value Yre is in a direction opposite to the yaw rate actual measurement value Yrs (FIG. 3, state C). Thus, the yaw rate estimated value Yre greatly diverges with respect to the yaw rate actual measurement value Yrs. The counter steering is performed when the side slipping is large, and thus the drift value Sdr also becomes greater (FIG. 3, state C).

Therefore, in the case of performing the counter steering to perform the driving operation of stopping the side slipping when the side slipping becomes large, the yaw moment in the opposite direction generates in the vehicle 1 if the returning of the steering wheel 30 is delayed when the side slipping is stopped. That is, if the steering direction of the steering wheel 30 is delayed from being returned from the state in which the counter steering is being performed to the steering direction suited to the actual traveling state of the vehicle 1, the yaw moment in the steering direction of the counter steering generates in the vehicle 1.

The yaw moment tends to become a large yaw moment due to the synergetic effect of the rapid change in the behavior of the vehicle 1 and the steering state, and the side slipping in the direction opposite to the direction of side slipping stopped by the counter steering may occur by such yaw moment in the vehicle 1. In this case, the drift value Sdr becomes the opposite direction, and the yaw rate estimated value Yre and the yaw rate actual measurement value Yrs both tend to have the respective direction of yaw rate in the opposite directions while having the direction of the yaw rate in the opposite directions, and hence the yaw rate estimated value Yre and the yaw rate actual measurement value Yrs are both diverged (FIG. 3, state D).

If a large side slipping occurs and the behavior becomes greatly disturbed at the time of traveling of the vehicle 1, the driver performs the operation of the counter steering in such manner so that the yaw rate gradually becomes smaller, and hence the yaw rate estimated value Yre and the yaw rate actual measurement value Yrs both become small, and the drift value Sdr also becomes small (FIG. 3, state E). When the side slipping settles down and the drift value Sr becomes a neutral state thereafter, the turning direction of the vehicle 1 and the steering direction of the driver become the same direction, and thus the yaw rate estimated value Yre and the yaw rate actual measurement value Yrs become substantially the same magnitude (FIG. 3, state F). The traveling state of the vehicle 1 is thus in a state the behavior is stable.

When performing the behavior control of the vehicle 1, the behavior control is performed on the basis of the actual state amount and the estimated state amount of the vehicle 1 that change in the above manner, but specifically, a state amount that becomes a reference when performing the behavior control is obtained as a target state amount based on the current state amount of the vehicle 1, and the control is performed so that the behavior stabilizes when a behavior of a magnitude of the target state amount is occurring in the vehicle 1.

The target state amount, which is the state amount used for the behavior control of the vehicle 1, is obtained by estimating based on the actual state amount and the estimated state amount at the time of traveling of the vehicle 1, but the actual state amount and the estimated state amount sometimes diverge in the above manner depending on the traveling state of the vehicle 1. Thus, when obtaining the target state amount, weighting is performed on the actual state amount and the estimated state amount in accordance with the state of the vehicle 1, and the target state amount is obtained from the weighted actual state amount and estimated state amount. The behavior control of the vehicle 1 is performed on the basis of the target state amount, which is obtained from the actual state amount and the estimated state amount performed with the weighting in accordance with the state of the vehicle 1.

Figure 4:
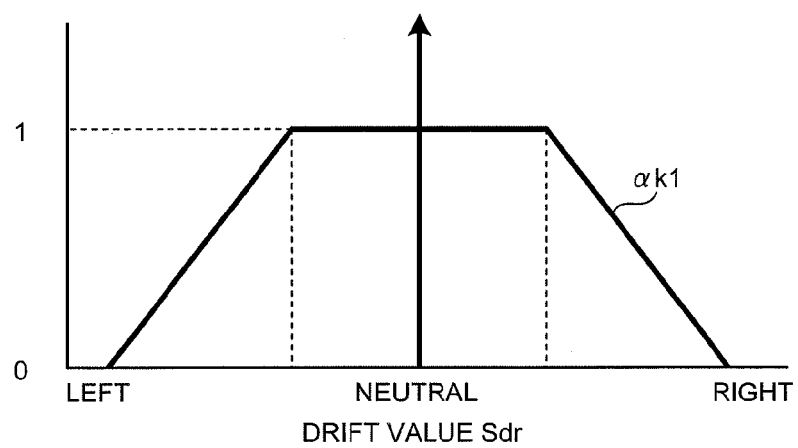
FIG. 4 is an explanatory view illustrating a relationship between a drift value and a weighting gain.

A case of obtaining the target state amount by performing weighting on the actual state amount and the estimated state amount of the vehicle 1, and performing the behavior control of the vehicle 1 will now be described. FIG. 4 is an explanatory view illustrating a relationship between the drift value and a weighting gain. When performing the weighting of the actual state amount and the estimated state amount of the vehicle 1, the weighting is performed by changing the gain of the weighting according to the drift value Sdr. That is, a weighting gain αk1 is set as a gain to be used when performing the weighting of the actual state amount and the estimated state amount of the vehicle 1, and the weighting gain αk1 is changed according to the drift value Sdr.

Specifically, the weighting gain αk1 changes within a range of zero to one, where the target state amount is obtained using only the actual state amount when the weighting gain αk1 is zero, and the target state amount is obtained using only the estimated state amount when the weighting gain αk1 is one. When the weighting gain αk1 is between zero and one, the weighting of the actual state amount and the estimated state amount in obtaining the target state amount changes according to the magnitude thereof, where the weighting of the actual state amount becomes larger as the weighting gain approaches zero from one.

On the contrary, the drift value Sdr is a value indicating the magnitude of the side slipping of the vehicle 1, and thus is in a neutral state when the side slipping is not occurring and becomes larger in the left and right direction as the side slipping becomes larger. With respect to the drift value Sdr set in such manner, the weighting gain αk1 is set to become one when the drift value Sdr indicates the neutral state in the left and right direction. The weighting gain αk1 also takes one not only when the drift value Sdr is in a completely neutral state but also when the value of the drift value Sdr is within a predetermined range in the left and right direction with the neutral state as the center.

When the value of the drift value Sdr becomes larger in the left and right direction and exceeds a predetermined range in the left and right direction with the neutral state as the center, the weighting gain αk1 becomes smaller as the drift value Sdr becomes larger in the left and right direction. Furthermore, the weighting gain αk1 becomes zero when the drift value Sdr becomes a predetermined magnitude in the left and right direction. That is, the weighting gain αk1 is set such that the weighting of the estimated state amount is large when the drift value Sdr is around neutral, and the weighting of the actual state amount becomes larger as the drift value Sdr moves away from around neutral. When estimating and obtaining the target state amount based on the actual state amount and the estimated state amount, estimation is made by performing the weighting on the actual state amount and the estimated state amount according to the drift value Sdr, that is, according to the state of the side slipping of the vehicle 1.

When performing the behavior control of the vehicle 1, the control is performed while changing the weighting of the actual state amount and the estimated state amount of the vehicle 1 according to the drift value Sdr, but the actual state amount and the estimated state amount tend to easily diverge as described above when the traveling state of the vehicle 1 becomes unstable. Thus, if the actual state amount and the estimated state amount diverge when the traveling state of the vehicle 1 becomes unstable, the target state amount at the time of the behavior control is obtained based on the state amount of larger weighting, but the drift value Sdr also easily changes if the traveling state of the vehicle 1 is unstable. Thus, the weighting of the state amount of the vehicle 1 also easily changes, and the target state amount may not stabilize. The traveling state in which the target state amount becomes unstable when the traveling state of the vehicle 1 becomes unstable will now be described.

Figure 5:
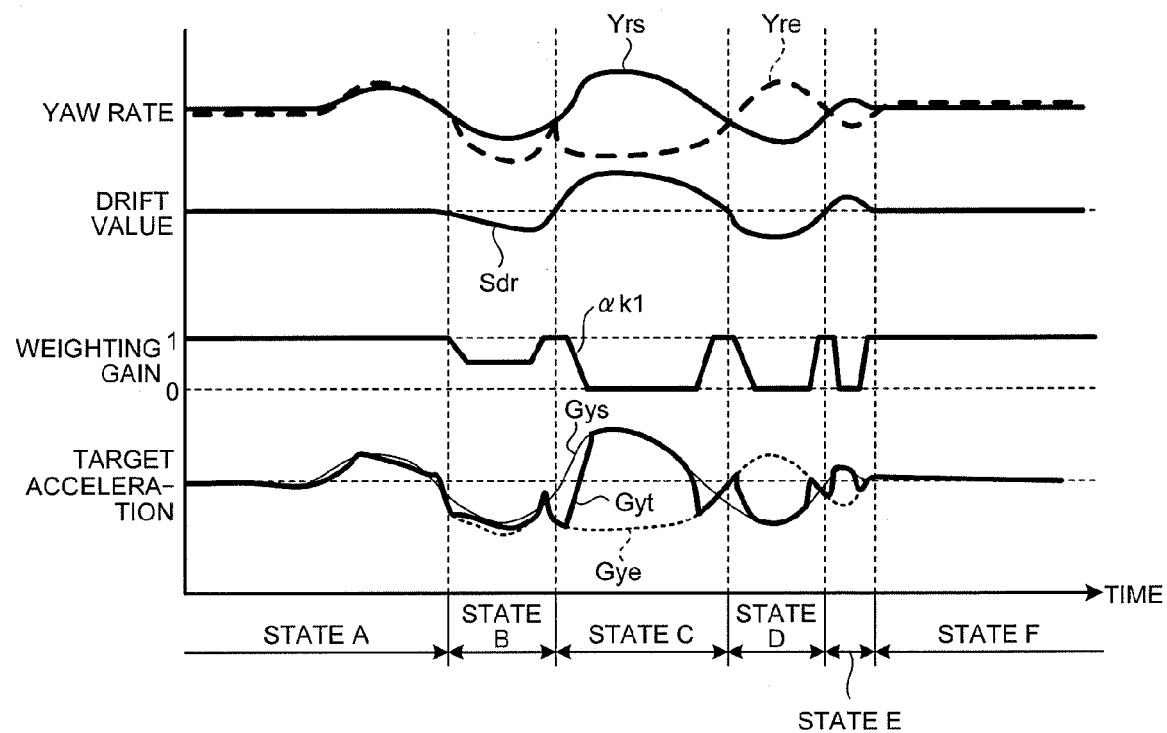
FIG. 5 is an explanatory view of when performing weighting on an actual measurement value and an estimated value of a state amount of a vehicle to perform a behavior control.

FIG. 5 is an explanatory view of when performing the weighting on the actual measurement value and the estimated value of the state amount of the vehicle to perform the behavior control. FIG. 5 illustrates the behavior control in the traveling state similar to the traveling state illustrated in FIG. 3, and is an explanatory view for a case of using the lateral acceleration for the target state amount at the time of the behavior control. The lateral acceleration is generated with the yaw rate in the vehicle 1 during the turning around the vehicle 1, but if the side slipping is not occurring and the traveling state is stable, the lateral acceleration, which is an example of the state amount at the time of traveling of the vehicle 1, has substantially the same magnitude for the actual measurement value and the estimated value. That is, if the side slipping is not occurring, a lateral acceleration actual measurement value Gys, which is the detection value of the lateral acceleration by the G sensor 62 and an example of the actual state amount, and a lateral acceleration estimated value Gye, which is the estimated value of the lateral acceleration estimated based on the steering angle and the vehicle speed and an example of the estimated state amount, have substantially the same magnitude (FIG. 5, state A).

If the traveling state at the time of traveling of the vehicle 1 is stable and the side slipping is not occurring, the drift value Sdr is maintained in a substantially neutral state. In this case, the weighting gain αk1 becomes one, and thus the target state amount is obtained using only the estimated state amount of the vehicle 1 when obtaining the target state amount. Thus, when using the lateral acceleration, for example, for the target state amount at the time of the behavior control of the vehicle 1, a target lateral acceleration Gyt, which is the lateral acceleration that becomes the target state amount, is obtained using only the lateral acceleration estimated value Gye.

Specifically, the target lateral acceleration Gyt obtained by performing the weighting using the weighting gain αk1 on the lateral acceleration estimated value Gye and the lateral acceleration actual measurement value Gys is obtained with the following equation (1). Therefore, when the weighting gain αk1 is one, the target lateral acceleration Gyt becomes substantially the same magnitude as the lateral acceleration estimated value Gye (FIG. 5, state A).

$$\text{Target lateral acceleration } Gyt = (Gye \times \alpha k1) + \{Gys \times (1 - \alpha k1)\} \quad (1)$$

When the traveling state of the vehicle 1 starts to become unstable and the side slipping starts to occur, the absolute value of the drift value Sdr starts to become large. Thus, the value of the weighting gain αk1 that changes according to the drift value Sdr becomes smaller according to the magnitude of the drift value Sdr (FIG. 5, state B).

When the side slipping starts to occur in the vehicle 1, the lateral acceleration actual measurement value Gys and the lateral acceleration estimated value Gye start to diverge similar to the yaw rate actual measurement value Yrs and the yaw rate estimated value Yre, but the weighting of the actual state amount becomes large when the drift value Sdr becomes smaller than one. In other words, the weighting of the lateral acceleration actual measurement value Gys becomes large. Thus, the target lateral acceleration Gyt is obtained from the values of both lateral accelerations, the lateral acceleration actual measurement value Gys and the lateral acceleration estimated value Gye, according to the weighting of the lateral acceleration actual measurement value Gys and the lateral acceleration estimated value Gye defined by the weighting gain αk1 (FIG. 5, state B). That is, the target lateral acceleration Gyt has a magnitude between the lateral acceleration actual measurement value Gys and the lateral acceleration estimated value Gye.

When the driver performs the operation of the counter steering to stop the side slipping of the vehicle 1, the direction of steering becomes the direction opposite to the direction of the side slipping, and thus the lateral acceleration estimated value Gye becomes a direction opposite to the lateral acceleration actual measurement value Gys and is in a diverged state. However, the initial stage in which the counter steering is performed is the stage in which the left and right direction of the drift value Sdr is switched and is a state of passing the neutral position, and thus the weighting gain αk1 becomes one while the drift value Sdr is positioned around neutral. During this time, the target lateral acceleration Gyt has substantially the same magnitude as the lateral acceleration estimated value Gye (FIG. 5, state C).

Thereafter, if the lateral acceleration estimated value Gye continues to greatly diverge with respect to the lateral acceleration actual measurement value Gys, and the absolute value of the drift value Sdr continues to become large, the weighting gain αk1 becomes smaller and becomes zero, and the target lateral acceleration Gyt becomes substantially the same magnitude as the lateral acceleration actual measurement value Gys (FIG. 5, state C). That is, in this case, the target lateral acceleration Gyt has the same magnitude as the lateral acceleration estimated value Gye, and hence suddenly changes to the same magnitude as the lateral acceleration actual measurement value Gys diverged with respect to the lateral acceleration estimated value Gye.

Furthermore, when the side slipping starts to become smaller by maintaining and continuing the counter steering, the behavior of the vehicle 1 and the driving operation become close, and the drift value Sdr becomes smaller. In this case, the weighting gain αk1 becomes greater and becomes one, and the target lateral acceleration Gyt becomes a magnitude substantially the same as the lateral acceleration estimated value Gye. Thus, the target lateral acceleration Gyt again suddenly changes from the magnitude same as the lateral acceleration actual measurement value Gys to the magnitude substantially the same as the lateral acceleration estimated value Gye (FIG. 5, state C).

When the driver performs the driving operation of suppressing the side slipping by the counter steering when the side slipping occurs during the traveling of the vehicle 1, the weighting gain αk1 changes when the left and right direction of the drift value Sdr is switched. Thus, the target lateral acceleration Gyt continues to suddenly change between the lateral acceleration actual measurement value Gys and the lateral acceleration estimated value Gye until the behavior of the vehicle 1 stabilizes (FIG. 5, states D, E).

When changing and controlling the weighting of the actual state amount and the estimated state amount of the vehicle 1 according to the drift value Sdr in performing the behavior control of the vehicle 1, the target state amount also suddenly changes easily as described above according to the drift value Sdr that easily changes when the traveling state is unstable. Thus, the traveling state at the time of the behavior control suddenly changes easily, and the weighting of the actual state amount and the estimated state amount of the vehicle 1 at the time of the behavior control is made appropriate in the vehicle state amount estimating device 2 according to the present embodiment. That is, the changing amount of the weighting gain αk1 that changes according to the drift value Sdr is limited, and the limitation on the changing amount of the weighting gain αk1 is terminated when a predetermined condition is satisfied to suppress the target state amount from suddenly changing between the actual state amount and the estimated state amount.

Figure 6:
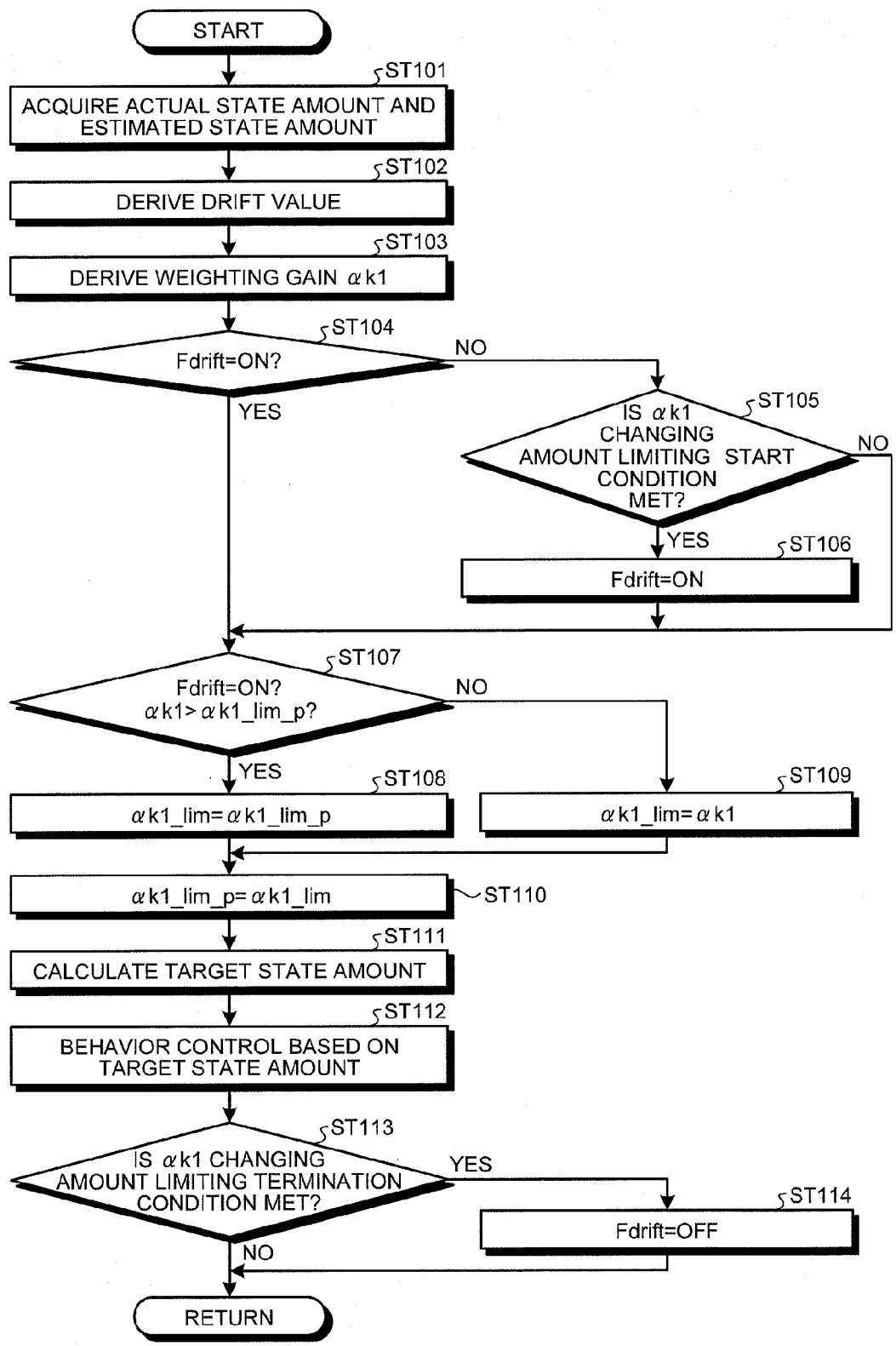
FIG. 6 is a flow chart illustrating an outline of a processing procedure of the vehicle state amount estimating device according to the embodiment.

FIG. 6 is a flowchart illustrating an outline of a processing procedure of the vehicle state amount estimating device according to the embodiment. Now, the outline of the processing procedure when performing the behavior control of the vehicle 1 in the vehicle state amount estimating device 2 according to the present embodiment will be described. The following processing are called out and executed every predetermined period when controlling each unit at the time of traveling of the vehicle 1. When performing the behavior control at the time of traveling of the vehicle 1, the actual state amount and the estimated state amount of the vehicle are first acquired (step ST101). For the actual state amount, the actual measurement values of the yaw rate and the lateral acceleration are acquired by acquiring the detection results of the yaw rate sensor 60 and the G sensor 62 with the traveling state acquiring unit 72 of the processing unit 71 of the ECU 70. For the estimated state amount, the vehicle speed and the steering angle are acquired by acquiring the detection results of the vehicle speed sensor 16 and the steering angle sensor 36 with the traveling state acquiring unit 72, and the vehicle speed and the steering angle are used to perform the calculation of a predetermined mathematical expression by the control value calculating unit 74 of the processing unit 71 of the ECU 70 to estimate the state amount. The estimated state amount is thus acquired by the control value calculating unit 74.

The drift value Sdr is then derived (step ST102). The drift value Sdr is derived by comparing the actual state amount and the estimated state amount. That is, although the drift value Sdr is a value indicating the magnitude of side slipping of the vehicle 1, the actual state amount and the estimated state amount are compared to derive the drift value Sdr based on the difference of the state amounts since the side slipping of the vehicle 1 is a state in which the driving operation of the driver and the actual behavior of the vehicle 1 are different.

The weighting gain αk1 is then derived (step ST103). This derivation is carried out by using a map stored in the storage unit 80 of the ECU 70 with the control value calculating unit 74. The map used in this case is set in advance as a map illustrating a relationship between the drift value Sdr and the weighting gain αk1 as illustrated in FIG. 4, and is stored in the storage unit 80. The control value calculating unit 74 derives the weighting gain αk1 by applying the drift value Sdr to the map. When deriving the weighting gain αk1 based on the drift value Sdr, something other than the map may be used for derivation, for example, a predetermined mathematical expression may be used for derivation.

It is determined whether or not a drift out flag Fdrift=ON (step ST104). This drift out flag Fdrift is set as a flag indicating whether or not the side slipping is occurring in the vehicle 1, and is switched to ON if the side slipping is occurring in the vehicle 1 and is set to OFF if the side slipping is not occurring. The determination on whether or not the drift out flag Fdrift switched in the above manner is set to ON is carried out by the control determining unit 75 of the processing unit 71 of the ECU 70.

If it is determined as not the drift out flag Fdrift=ON according to the determination (step ST104, No determination), that is, if it is determined as drift out flag Fdrift=OFF, it is determined whether or not a αk1 changing amount limiting start condition is met (step ST105). The αk1 changing amount limiting start condition is a condition in starting a control to limit the changing amount of the weighting gain αk1 used in performing the behavior control of the vehicle 1.

Specifically, with respect to the αk1 changing amount limiting start condition, the start condition of the αk1 changing amount limitation is when the weighting gain αk1 that changes according to the magnitude of the drift value Sdr is smaller than or equal to a drift out threshold value THout, which is a threshold value used to determine whether or not to start the limitation of the changing amount of the weighting gain αk1. Thus, when determining whether such condition is met, the weighting gain αk1 and the drift out threshold value THout are compared and it is determined whether or not αk1≤THout is met by the control determining unit 75 of the processing unit 71 of the ECU 70.

The control determining unit 75 determines that the αk1 changing amount limiting start condition is met if αk1≤THout is met, and determines that the αk1 changing amount limiting start condition is not met if αk1≤THout is not met. The drift out threshold value THout used when performing such determination is set in advance as a threshold value of the weighting gain αk1 when performing the determination on whether or not the αk1 changing amount limiting start condition is met based on the value of the weighting gain αk1, and is stored in the storage unit 80 of the ECU 70.

Since the weighting gain αk1 changes according to the drift value Sdr indicating the state of the side slipping of the vehicle 1, the drift out threshold value THout, which is the threshold value of the weighting gain αk1 is, in other words, a threshold value of the side slipping capable of determining the state of the side slipping of the vehicle 1 through the weighting gain αk1. Thus, if the αk1 changing amount limiting start condition {αk1≤THout} is met, this indicates that the side slipping is larger than or equal to a predetermined value, where determination is made that the αk1 changing amount limiting start condition is met when the side slipping is larger than or equal to the predetermined value.

If it is determined that the αk1 changing amount limiting start condition is met according to the determination of the control determining unit 75 (step ST105, Yes determination), that is, if it is determined that αk1≤THout is met, the drift out flag Fdrift=ON is executed (step ST106). The drift out flag Fdrift can be switched by the flag switching unit 76 of the processing unit 71 of the ECU 70, which the flag switching unit 76 switches the drift out flag Fdrift in the OFF state to ON.

When the drift out flag Fdrift is switched to ON by the flag switching unit 76, or when it is determined that αk1≤THout is not met and the αk1 changing amount limiting start condition is not met according to the determination of the control determining unit 75(step ST105, No determination), or when it is determined that the drift out flag Fdrift=ON according to the determination of the control determining unit 75 (step ST104, No determination), it is determined whether or not Fdrift=ON and αk1>αk1_lim_p (step ST107). Here, αk1_lim_p used when performing such determination is a previous value of αk1_lim, which is a variable, and αk1_lim is a variable when performing the control of the changing amount limitation of the weighting gain αk1. When performing such determination, it is determined whether or not the drift out flag Fdrift is switched to ON and the current weighting gain αk1 is greater than αk1_lim_p by the control determining unit 75.

Describing the control of the changing amount limitation of the weighting gain αk1, although the weighting gain αk1 changes according to the drift value Sdr, the changing amount limitation of the weighting gain αk1 is controlled so that the value of the weighting gain αk1 does not become greater. That is, when the weighting gain αk1 changes according to the drift value Sdr, the change in the direction the value of αk1 becomes smaller is tolerated, but the change in the direction the value of αk1 becomes greater is regulated. The weighting gain αk1 is the gain of weighting of the actual state amount and the estimated state amount, and thus, the changing amount limitation of the weighting gain αk1 is controlled so that the change in the direction the weighting of the actual state amount becomes greater is tolerated and the change in the direction the weighting of the estimated state amount becomes greater is regulated. Thus, the control of the changing amount limitation of the weighting gain αk1 is a control of limiting the weighting of the estimated state amount and tolerating the increase in the weighting of the actual state amount according to the state of the side slipping to maintain a state in which the weighting of the actual state amount is large regardless of the state of the side slipping.

The changing amount limitation of the weighting gain αk1 is the control described above, where αk1_lim_p is a minimum value of the weighting gain αk1 of when the weighting gain αk1 is changed during a series of controls while the drift out flag Fdrift is switched to ON. That is, αk1_lim_p is rewritten every time the minimum value of the weighting gain αk1 is updated. Here, αk1_lim_p has an initial value of when the drift out flag Fdrift is switched from OFF to ON as one. The control determining unit 75 determines whether or not αk1>αk1_lim_p by comparing αk1_lim_p and the current weighting gain αk1, and also determines whether or not the drift out flag Fdrift is set to ON.

If it is determined that Fdrift=ON and αk1>αk1_lim_p according to this determination (step ST107, Yes determination), αk1_lim=αk1_lim_p is executed (step ST108). That is, the control value calculating unit 74 sets the value of αk1_lim to αk1_lim_p, which is the previous value of αk1_lim, to maintain the magnitude of αk1_lim.

If it is determined as not Fdrift=ON and αk1>αk1_lim_p (step ST107, No determination), that is, if it is determined that the drift out flag Fdrift is set to OFF or if it is determined that the current weighting gain αk1 is smaller than or equal to αk1_lim_p, αk1_lim=αk1 is executed (step ST109). If it is determined that the current weighting gain αk1 is smaller than or equal to αk1_lim, αk1_lim=αk1 is calculated by the control value calculating unit 74 to rewrite the value of αl1_lim to the value of the weighting gain αk1 in which the minimum value is updated.

After performing the changing amount limiting processing of the weighting gain αk1 by maintaining the value of αk1_lim (step ST108) or rewriting the value of αk1_lim (step ST109), αk1_lim_p=αk1_lim is executed (step ST110). In other words, a current value of αk1_lim is substituted to αk1_lim_p to be used as the previous value of the αk1_lim in the next control routine. Thus, when using αk1_lim_p in the next control routine, such value can be used as the previous value of αk1_lim.

The target state amount is then calculated (step ST111). For example, when calculating the target lateral acceleration Gyt as an example of the target state amount, the weighting is performed with the weighting gain αk1 on the lateral acceleration actual measurement value Gys and the lateral acceleration estimated value Gye acquired by the traveling state acquiring unit 72 and the control value calculating unit 74 to calculate the target lateral acceleration Gyt. In other words, the equation (1) described above is calculated by the control value calculating unit 74 to calculate the target lateral acceleration Gyt.

In the vehicle state amount estimating device 2 according to the present embodiment, αk1_lim is calculated as the minimum value of the weighting gain αk1 when performing the control to limit the changing amount of the weighting gain αk1. Thus, when performing the weighting on the lateral acceleration actual measurement value Gys and the lateral acceleration estimated value Gye, the weighting is performed using αk1_lim. The target lateral acceleration Gyt is calculated by the lateral acceleration actual measurement value Gys and the lateral acceleration estimated value Gye on which the weighting is performed with αk1_lim.

After calculating the target state amount, the behavior control is performed based on the target state amount (step ST112). That is, each device controlled when performing the behavior control of the vehicle 1 is controlled with the travel control unit 73 of the processing unit 71 of the ECU 70 based on the target state amount such as the target lateral acceleration Gyt calculated by the control value calculating unit 74. For example, the roll amount of the vehicle 1 is adjusted by controlling the stabilizer actuator 45, the braking force is generated in some wheels 5 by controlling the brake hydraulic pressure control device 50, and the behavior control is performed by generating the desired yaw moment in the travel control unit 73.

After performing the behavior control of the vehicle 1, it is determined whether or not the αk1 changing amount limiting termination condition is met next (step ST113). The αk1 changing amount limiting termination condition is a condition in terminating the control to limit the changing amount of the weighting gain αk1. With respect to the αk1 changing amount limiting termination condition, the termination condition of the αk1 changing amount limitation is when the state where the side slipping is reduced is continued for a predetermined time or longer. That is, the termination condition of the αk1 changing amount limitation is when the state in which the difference between the actual state amount and the estimated state amount is smaller than or equal to a predetermined value is continued for a predetermined time, and the state in which the weighting of the actual state amount is large is released when such condition is met.

Specifically, a state in which the absolute value of the drift value Sdr is smaller than or equal to a drift value stable threshold value THsdrs, which is a threshold value indicating that the drift value Sdr is positioned around neutral, and in which the difference between the actual state amount and the estimated state amount of the vehicle 1 is smaller than or equal to a predetermined threshold value, is continued for a predetermined time is the termination condition of the αk1 changing amount limitation. That is, the drift value Sdr and the drift value stable threshold value THsdrs determine whether or not equation (2) below is met. Whether or not the difference between the actual state amount and the estimated stat amount is smaller than or equal to the predetermined threshold value is, for example, includes determining whether or not a relationship of the lateral acceleration actual measurement value Gys, the lateral acceleration estimated value Gye, and a Gy stable threshold value THgys, which is a threshold value in determining the state where the side slipping is reducing based on the difference of the above, meets the following equation (3).

$$|Sdr| \leq THsdrs \quad (2)$$

$$|Gye - Gys| \leq THgys \quad (3)$$

The termination condition of the αk1 changing amount limitation is contingent to if a state in which both equation (2) and equation (3) are met is continued for a drift value stabilization time threshold value THtmsdrs or longer. That is, the state in which the weighting of the actual state amount is large is released when a state in which the difference between the actual state amount and the estimated state amount is smaller than or equal to the Gy stable threshold value THgys, which is a predetermined value used to determine the termination of control, and the side slipping is smaller than or equal to a predetermined value is continued for the drift value stabilization time threshold value THtmsdrs, which is a predetermined time. The drift value stabilization time threshold value THtmsdrs used in the determination is set in advance as one termination condition of the αk1 changing amount limitation, and is stored in the storage unit 80 of the ECU 70. In determining whether or not the αk1 changing amount limiting termination condition is met, it is determined whether or not each condition is met by the control determining unit 75.

If it is determined that the αk1 changing amount limiting termination condition is not met according to the determination (step ST113, No determination), the processing procedure is terminated while maintaining the drift out flag Fdrift in the ON state.

If determined that the αk1 changing amount limiting termination condition is met (step ST113, Yes determination), the drift out flag Fdrift=OFF is executed (step ST114). That is, the drift out flag Fdrift in the ON state is switched to OFF by the flag switching unit 76. After switching the drift out flag Fdrift to OFF, the processing procedure is terminated. When performing the behavior control of the vehicle 1, the control is performed with such processing procedure to suppress the traveling state from suddenly changing.

Figure 7:
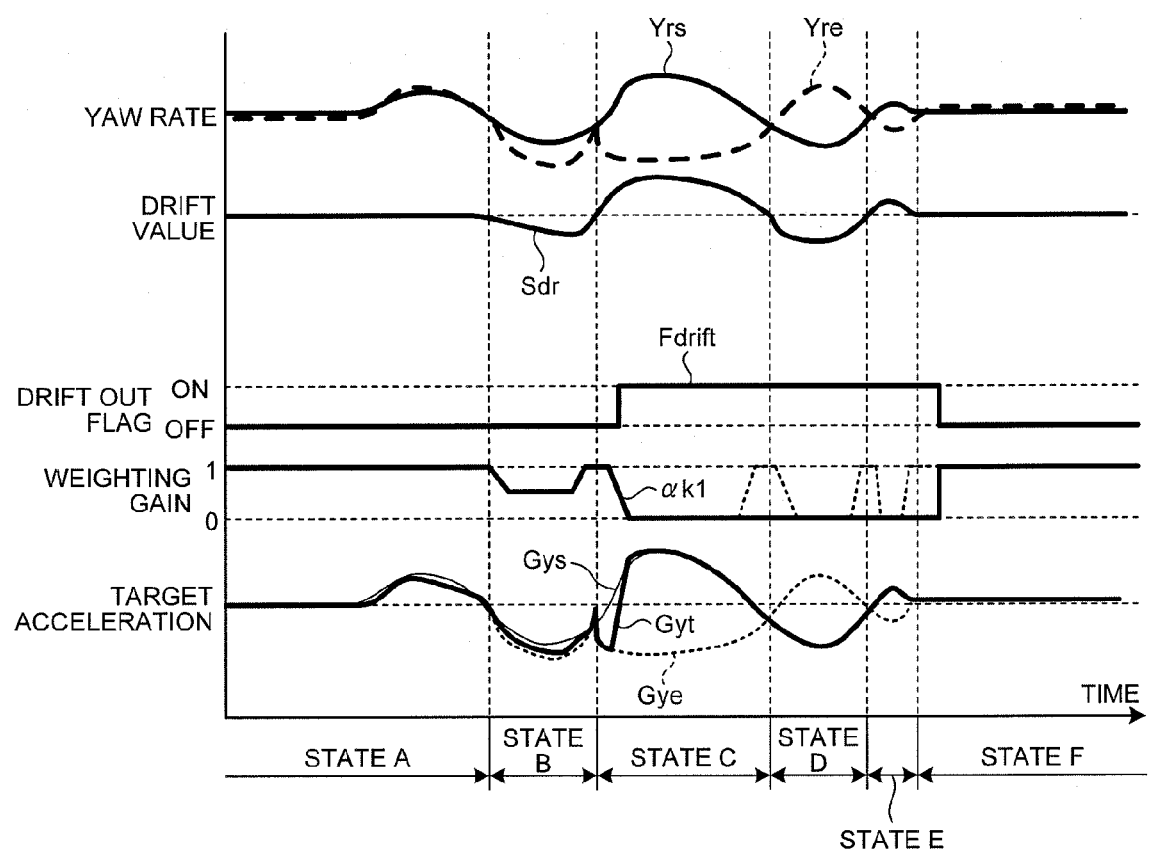
FIG. 7 is an explanatory view of when performing the behavior control including a changing amount limitation of a weighting gain of the state amount.

FIG. 7 is an explanatory view of when performing the behavior control including the changing amount limitation of the weighting gain of the state amount. FIG. 7 is an explanatory view of when using the lateral acceleration as the target state amount at the time of behavior control, similar to FIG. 5, and is an explanatory view for a case including the changing amount limitation of the weighting gain in the case of the traveling state illustrated in FIG. 5. If the side slipping is not occurring at the time of turning around the vehicle 1 and the traveling state is stable, the lateral acceleration actual measurement value Gys and the lateral acceleration estimated value Gye have substantially the same magnitude (FIG. 7, state A). If the side slipping is not occurring, the drift value Sdr is maintained in a substantially neutral state and the weighting gain αk1 is one, and hence the target lateral acceleration Gyt has substantially the same magnitude as the lateral acceleration estimated value Gye (FIG. 7, state A).

When the weighting gain αk1 is one, the {weighting gain αk1≤drift out threshold value THout}, which is the start condition of the αk1 changing amount limitation, is not met, and thus the drift out flag Fdrift is maintained in the OFF state (FIG. 7, state A).

When the side slipping starts to occur in the vehicle 1 and the absolute value of the drift value Sdr starts to become large, the value of the weighting gain αk1 starts to become smaller in accordance with the magnitude of the drift value Sdr (FIG. 7, state B). When the side slipping starts to occur in the vehicle 1 and the lateral acceleration actual measurement value Gys and the lateral acceleration estimated value Gye start to diverge, the target lateral acceleration Gyt is obtained from the lateral acceleration actual measurement value Gys and the lateral acceleration estimated value Gye according to the weighting of the lateral acceleration actual measurement value Gys and the lateral acceleration estimated value Gye defined by the weighting gain αk1 (FIG. 7, state B).

Even if the weighting gain αk1 becomes small according to the magnitude of the drift value Sdr, the drift out flag Fdrift is maintained in the OFF state if the weighting gain αk1 is greater than the drift out threshold value THout (FIG. 7, state B).

When the driver performs the operation of counter steering to stop the side slipping of the vehicle, the lateral acceleration estimated value Gye is diverged with respect to the lateral acceleration actual measurement value Gys, but the drift value Sdr is positioned around neutral and the weighting gain αk1 is one in the initial stage in which the counter steering is performed. That is, since the drift out flag Fdrift is set to OFF, the control of the αk1 changing amount limitation is not started, and the weighting gain αk1 is in a state changeable according to the drift value Sdr, and thus the weighting gain αk1 is one. During this time, the target lateral acceleration Gyt has substantially the same magnitude as the lateral acceleration estimated value Gye (FIG. 7, state C).

Thereafter, when the lateral acceleration estimated value Gye greatly diverges with respect to the lateral acceleration actual measurement value Gys and the absolute value of the drift value Sdr becomes large, and the weighting gain αk1 becomes smaller and becomes zero, the target lateral acceleration Gyt becomes substantially the same magnitude as the lateral acceleration actual measurement value Gys (FIG. 7, state C). When the weighting gain αk1 becomes zero in such manner, {weighting gain≤drift out threshold value THout} is met, and thus the drift out flag Fdrift is switched to ON (FIG. 7, state C). The control of the αk1 changing amount limitation is thereby started.

Furthermore, when the side slipping starts to become smaller by continuously maintaining the counter steering, the drift value Sdr becomes small, but the changing amount of the weighting gain αk1 is limited since the drift out flag Fdrift is set to ON. That is, regarding the weighting gain αk1, only the change in the direction the value becomes smaller is tolerated and the change in the direction the value becomes greater is regulated. Thus, the weighting gain αk1 is maintained in a state of zero. In other words, the weighting gain αk1 is provided with a hysteresis in the direction the value becomes smaller, that is, the direction the weighting of the lateral acceleration actual measurement value Gys becomes larger when the value of the weighting gain αk1 becomes smaller than or equal to the drift out threshold value THout. Therefore, the target lateral acceleration Gyt is maintained in the state of the same magnitude as the lateral acceleration actual measurement value Gys (FIG. 7, state C).

While the drift out flag Fdrift is set to ON and the control of the αk1 changing amount limitation is being carried out, the weighting gain αk1 is maintained in the zero state without the value becoming larger. Thus, even if the driver performs the driving operation of suppressing the side slipping by the counter steering and the change is repeated with the lateral acceleration actual measurement value Gys and the lateral acceleration estimated value Gye diverged, the target lateral acceleration Gyt is maintained in the state of the same magnitude as the lateral acceleration actual measurement value Gys (FIG. 7, states D, E).

Thus, when the side slipping becomes smaller by performing the driving operation of the counter steering, the drift value Sdr approaches the neutral state and the divergence of the lateral acceleration actual measurement value Gys and the lateral acceleration estimated value Gye becomes smaller. If the condition of terminating the control of the αk1 changing amount limitation is met when the drift value Sdr, the lateral acceleration actual measurement value Gys and the lateral acceleration estimated value Gye are changed in such manner, the control of the αk1 changing amount limitation is terminated.

That is, if the state in which {|drift value Sdr|≤drift value stable threshold value THsdrs} and {|lateral acceleration estimated value Gye−lateral acceleration actual measurement value Gys|≤Gy stable threshold value THgys} are met is continued for the drift value stabilization time threshold value THtmsdrs or longer, the drift out flag Fdrift is switched from ON to OFF (FIG. 7, state F). The control of the αk1 changing amount limitation is thereby terminated, so that the weighting gain αk1 changes according to the drift value Sdr, and the target lateral acceleration Gyt is obtained by the lateral acceleration actual measurement value Gys and the lateral acceleration estimated value Gye weighted by the weighting gain αk1.

The vehicle state amount estimating device 2 described above estimates the target lateral acceleration Gyt, which is one example of the state amount to use in the behavior control of the vehicle 1, based on the lateral acceleration actual measurement value Gys and the lateral acceleration estimated value Gye, and performs the control of the changing amount limitation of the weighting gain αk1 when the weighting gain αk1 that changes according to the drift value Sdr becomes smaller than or equal to the drift out threshold value THout. That is, when the side slipping is occurring, the lateral acceleration actual measurement value Gys and the lateral acceleration estimated value Gye are diverged, but determination can be made that the side slipping is larger based on the weighting gain αk1, where the control of the changing amount limitation of the weighting gain αk1 is carried out when determination can be made that the lateral acceleration actual measurement value Gys and the lateral acceleration estimated value Gye are diverged. The control of the changing amount limitation of the weighting gain αk1 maintains the state in which the weighting of the lateral acceleration actual measurement value Gys by the weighting gain αk1 is large regardless of the state of the drift value Sdr of the vehicle 1. Thus, the weighting in obtaining the target lateral acceleration Gyt can be suppressed from changing between the lateral acceleration actual measurement value Gys and the lateral acceleration estimated value Gye even if the drift value Sdr is changed, and the sudden change in the target lateral acceleration Gyt that occurs when the weighting gain αk1 changes with the lateral acceleration actual measurement value Gys and the lateral acceleration estimated value Gye diverged can be suppressed.

The control of the changing amount limitation of the weighting gain αk1 terminates when the state in which the difference between the lateral acceleration actual measurement value Gys and the lateral acceleration estimated value Gye is smaller than or equal to the Gy stable threshold value THgys is continued for the drift value stabilization time threshold value THtmsdrs or longer, and the state in which the weighting of the lateral acceleration actual measurement value Gys is large is released. Thus, the control of the changing amount limitation of the weighting gain αk1 terminates after the difference between the lateral acceleration actual measurement value Gys and the lateral acceleration estimated value Gye in the diverged state becomes small, and the control is returned to the control of changing the weighting gain αk1 according to the side slipping, and thus the changing of the weighting gain αk1 with the lateral acceleration actual measurement value Gys and the lateral acceleration estimated value Gye diverged can be more reliably suppressed, and the sudden change of the target lateral acceleration Gyt can be suppressed. As a result, the sudden change in the behavior at the time of the behavior control of the vehicle 1 can be suppressed.

The accuracy of the target lateral acceleration Gyt when the lateral acceleration actual measurement value Gys and the lateral acceleration estimated value Gye are diverged, or when the diverging direction is changed can be enhanced such as at the time of occurrence of side slipping, at the time of high G traveling by performing the changing amount limitation of the weighting gain $\alpha k1$. As a result, the traveling stability at the time of traveling in a state the traveling state of the vehicle 1 tends to easily become unstable can be enhanced.

The changing amount limitation of the weighting gain $\alpha k1$ terminates when the state in which the difference between the lateral acceleration actual measurement value Gys and the lateral acceleration estimated value Gye is smaller than or equal to the Gy stable threshold value THgys, and the drift value Sdr is smaller than or equal to the drift value stable threshold value THsdrs is continued for the drift value stabilization time threshold value THtmsdrs or longer. The changing amount limitation of the weighting gain $\alpha k1$ can be terminated after achieving the state in which the drift value Sdr is smaller than or equal to the drift value stable threshold value THsdrs, and thus can be terminated after the side slipping is more reliably reduced, whereby the sudden change in the target lateral acceleration Gyt can be more reliably suppressed. As a result, the sudden change in the behavior at the time of the behavior control of the vehicle 1 can be more reliably suppressed.

When the weighting gain $\alpha k1$ becomes smaller than or equal to the drift out threshold value THout, the state in which the weighting of the lateral acceleration actual measurement value Gys is large is maintained by limiting the weighting of the lateral acceleration estimated value Gye, and thus the weighting can be more reliably suppressed from changing between the lateral acceleration actual measurement value Gys and the lateral acceleration estimated value Gye. As a result, the weighting gain $\alpha k1$ is more reliably suppressed from changing with the lateral acceleration actual measurement value Gys and the lateral acceleration estimated value Gye diverged, and the sudden change in the behavior control at the time of the behavior control of the vehicle 1 can be more reliably suppressed.

When maintaining a state in which the weighting of the lateral acceleration actual measurement value Gys is large, the increase in the weighting of the lateral acceleration actual measurement value Gys according to the drift value Sdr is tolerated, and thus the state in which the weighting of the lateral acceleration actual measurement value Gys is large can be more reliably maintained when performing the changing amount limitation of the weighting gain $\alpha k1$. As a result, the weighting can be more reliably suppressed from changing between the lateral acceleration actual measurement value Gys and the lateral acceleration estimated value Gye when the lateral acceleration actual measurement value Gys and the lateral acceleration estimated value Gye are diverged, and the sudden change in the behavior at the time of the behavior control of the vehicle 1 can be more reliably suppressed.

Furthermore, since the weighting of the lateral acceleration actual measurement value Gys increases when the lateral acceleration actual measurement value Gys and the lateral acceleration estimated value Gye are diverged, the target lateral acceleration Gyt in a state the traveling state is in an unstable state can be brought closer to the actual state amount of the vehicle 1. That is, the estimated state amount such as the lateral acceleration estimated value Gye for estimating the state amount of the vehicle 1 based on the driving operation greatly diverges with respect to the actual state amount since the direction of the driving operation differs from the actual direction of behavior of the vehicle 1 when stopping the side slipping by performing the counter steering when a large side slipping occurred, for example, when the traveling state of the vehicle 1 is unstable. Thus, when performing the changing amount limitation of the weighting gain $\alpha k1$ since the lateral acceleration actual measurement value Gys and the lateral acceleration estimated value Gye are diverged, the behavior control can be performed with the target lateral acceleration Gyt brought close to the actual state amount of the vehicle 1 by increasing the weighting of the lateral acceleration actual measurement value Gys. As a result, a more appropriate behavior control can be performed.

In the vehicle state amount estimating device 2 described above, description is made assuming the behavior control is performed by controlling the stabilizer actuator 45 and the brake hydraulic pressure control device 50 when performing the behavior control based on the target state amount, but the actuator used in the behavior control may be other than the above. The actuator used when performing the behavior control based on the target state amount is not limited to the mode and the control method described above as long as the traveling state of the vehicle 1 can be stabilized by being controlled based on the target state amount.

In the vehicle state amount estimating device 2 described above, the lateral acceleration is used for the state amount for performing weighting with the weighting gain $\alpha k1$, and the target lateral acceleration Gyt is estimated while limiting the changing amount of the weighting of the lateral acceleration actual measurement value Gys and the lateral acceleration estimated value Gye when performing the changing amount limitation of the weighting gain $\alpha k1$, but the state amount for performing the weighting with the weighting gain $\alpha k1$ may be other than the lateral acceleration. The state amount for performing the weighting with the weighting gain $\alpha k1$ may be a state amount other than the lateral acceleration as long as it is the actual state amount and the estimated state amount capable of estimating the state amount to use in the behavior control of the vehicle 1 such as the yaw rate, for example.

REFERENCE SIGNS LIST

1 VEHICLE
2 VEHICLE STATE AMOUNT ESTIMATING DEVICE
5 WHEEL
10 DRIVE DEVICE
12 ENGINE
15 AUTOMATIC TRANSMISSION
16 VEHICLE SPEED SENSOR
20 ACCELERATOR PEDAL
25 BRAKE PEDAL
30 STEERING WHEEL
35 EPS DEVICE
36 STEERING ANGLE SENSOR
40 STABILIZER
45 STABILIZER ACTUATOR
50 BRAKE HYDRAULIC PRESSURE CONTROL DEVICE
60 YAW RATE SENSOR
62 G SENSOR
70 ECU
71 PROCESSING UNIT
72 TRAVELING STATE ACQUIRING UNIT
73 TRAVEL CONTROL UNIT
74 CONTROL VALUE CALCULATING UNIT
75 CONTROL DETERMINING UNIT
76 FLAG SWITCHING UNIT
80 STORAGE UNIT
81 INPUT/OUTPUT UNIT

The invention claimed is:

1. A vehicle state amount estimating device comprising:
an actual state amount acquiring unit configured to acquire an actual state amount that is an actual measurement value of a traveling state of a vehicle at a time of traveling of the vehicle;
an estimated state amount estimation unit configured to estimate, based on a driving operation of the vehicle, an estimated state amount that is an estimated value of a traveling state of the vehicle;
a target state amount obtaining unit configured to obtain a target state amount used in a behavior control of the vehicle by multiplying the actual state amount and the estimated state amount by weighting gains; and
a weighting gain setting unit configured to set the weighting gains based on a drift value indicating a magnitude of a slide slipping of the vehicle, wherein the weighting gain setting unit is configured to maintain, regardless of the drift value, a first state in which the weighting gain multiplying the actual state amount is larger than the weighting gain multiplying the estimated state amount, to release the first state when a state in which a difference between the actual state amount and the estimated state amount is smaller than or equal to a second value is continued for a predetermined time, and to tolerate an increase in the weighting gain multiplying the actual state amount according to the drift value when maintaining the first state,
wherein at least one of a stabilizer or a brake hydraulic pressure control device of a vehicle is controlled based on the obtained target state amount.

2. The vehicle state amount estimating device according to claim 1, wherein the first state is released when a state in which the difference between the actual state amount and the estimated state amount is smaller than or equal to the second value and the drift value is smaller than or equal to the first value is continued for the predetermined time.

3. The vehicle state amount estimating device according to claim 2, wherein the first state is maintained by limiting the weighting gain multiplying the estimated state amount when the drift value becomes larger than or equal to the first value.

4. The vehicle state amount estimating device according to claim 1, wherein the first state is maintained by limiting the weighting gain multiplying of the estimated state amount when the drift value becomes larger than or equal to the first value.

5. An apparatus for suppressing sudden change in behavior at a time of behavior control of a vehicle, comprising:
a stabilizer for adjusting a transmission rate of vertical motion of one wheel to a second wheel supported by a suspension unit of a vehicle;
a brake hydraulic pressure control device for adjusting hydraulic pressure with respect to each wheel cylinder arranged in a vicinity of each of the one wheel and the second wheel;
an electronic control unit, including program logic, configured to:
acquire an actual state amount that is an actual measurement value of a traveling state of a vehicle at a time of traveling of the vehicle;
estimate, based on a driving operation of the vehicle, an estimated state amount that is an estimated value of a traveling state of the vehicle;
obtain a target state amount used in a behavior control of the vehicle by multiplying the actual state amount and the estimated state amount by weighting gains;
set the weighting gains based on a drift value indicating a magnitude of a slide slipping of the vehicle, wherein the weighting gain setting unit is configured to maintain, regardless of the drift value, a first state in which the weighting gain multiplying the actual state amount is larger than the weighting gain multiplying the estimated state amount, to release the first state when a state in which a difference between the actual state amount and the estimated state amount is smaller than or equal to a second value is continued for a predetermined time, and to tolerate an increase in the weighting gain multiplying the actual state amount according to the drift value when maintaining the first state; and
control at least one of the stabilizer or the brake hydraulic pressure control device based on the obtained target state amount.

* * * * *